G. M. REAGEN.
AMUSEMENT DEVICE.
APPLICATION FILED DEC. 15, 1915.
1,192,226.
Patented July 25, 1916.
3 SHEETS—SHEET 3.
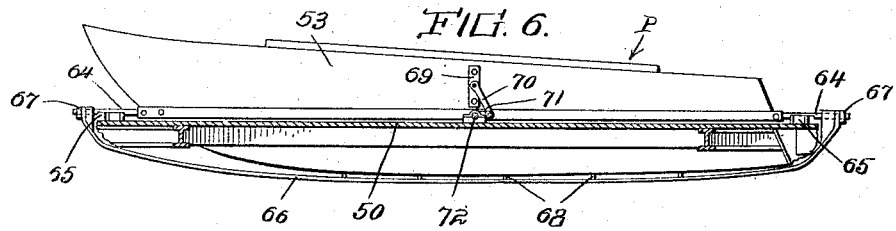
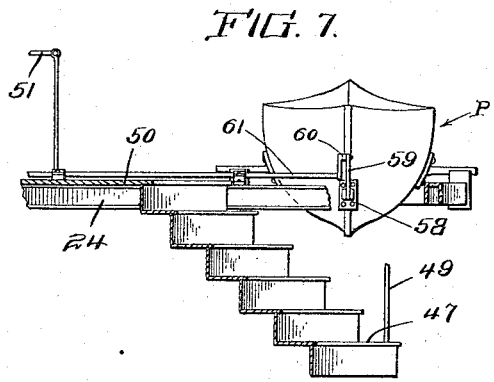
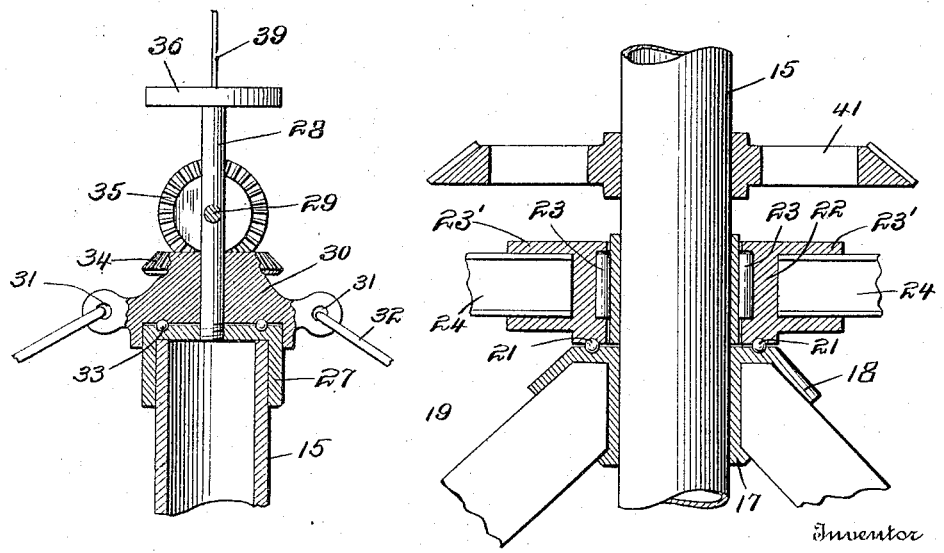
G. M. Reagen,
By Victor J. Evans
Attorney

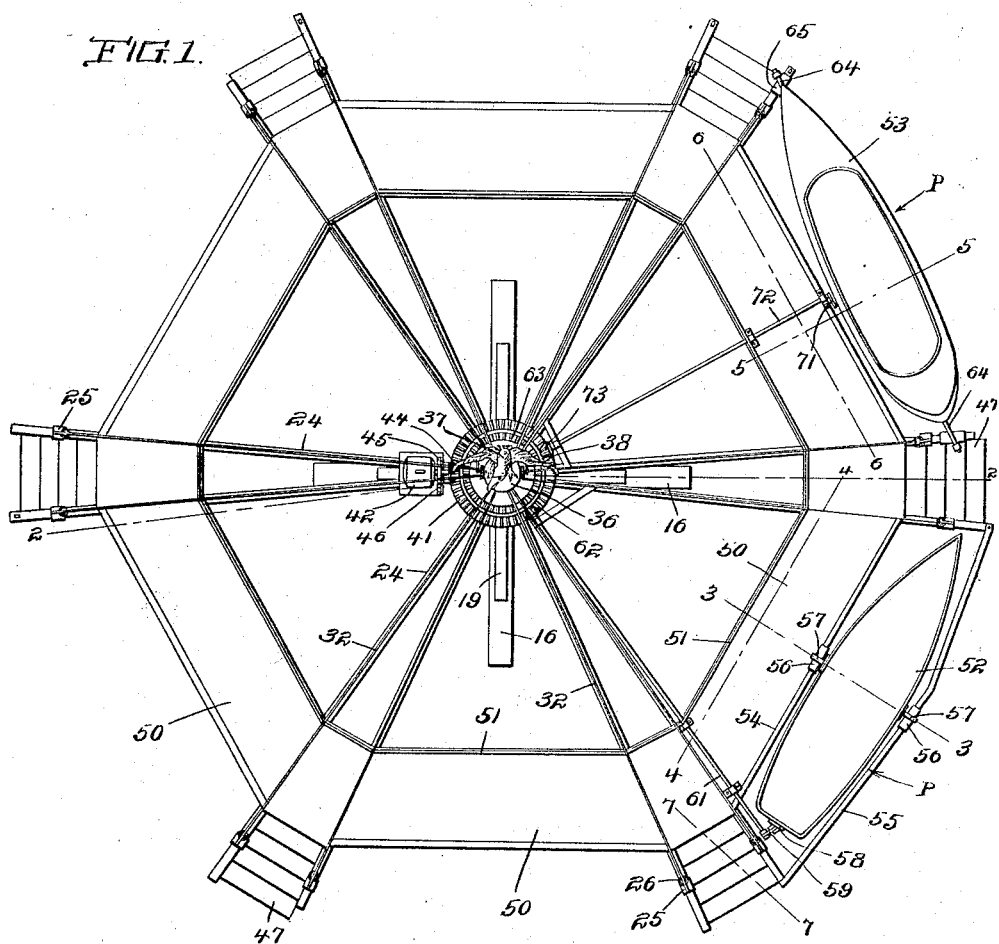

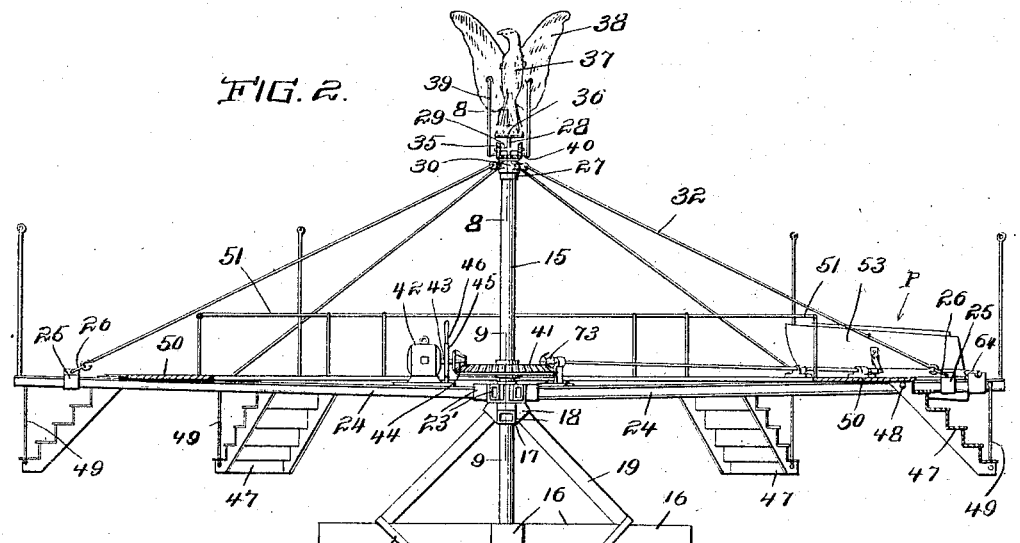
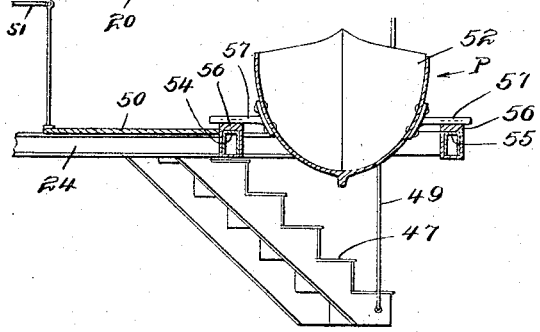
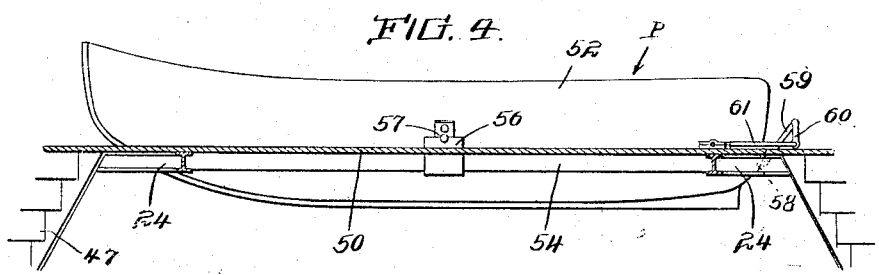

UNITED STATES PATENT OFFICE.

GEORGE M. REAGEN, OF COSHOCTON, OHIO, ASSIGNOR OF ONE-HALF TO FRED A. SCHWARTZ, OF COSHOCTON, OHIO.

AMUSEMENT DEVICE.

1,192,226. Specification of Letters Patent. Patented July 25, 1916.

Application filed December 15, 1915. Serial No. 66,981.

*To all whom it may concern:*

Be it known that I, GEORGE M. REAGEN, a citizen of the United States, residing at Coshocton, in the county of Coshocton and State of Ohio, have invented new and useful Improvements in Amusement Devices, of which the following is a specification.

This invention relates to amusement devices of the "round-about" or "merry-go-round" type, and it has for its object to produce a simple and improved device of this character which may be readily knocked down or disassembled for transportation and which may be easily and quickly set up for operation.

A further object of the invention is to produce a machine of the type referred to embodying a stationary upright or center pole and a rotary element equipped with floor sections, with steps arranged for convenient access to the floor sections and with cars or vehicles for the accommodation of passengers.

A further object of the invention is to produce a machine of the type described in which the passenger vehicle will be made to represent vessels for navigating the sea or the air, such as boats, canoes, dirigible air ships or the like, and in which the said vehicles or vessels will be suspended in such a manner that they may be rocked or oscillated, means being provided whereby when the machine is in operation such rocking or oscillatory motion will be imparted to the said vessels or vehicles.

A further object of the invention is to simplify and improve the general construction and operation of a machine in which the features herein enumerated are embodied.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a vertical sectional view taken on the line 2—2 in Fig. 1. Fig. 3 is a sectional detail view taken on the line 3—3 in Fig. 1. Fig. 4 is a sectional detail view taken on the line 4—4 in Fig. 1. Fig. 5 is a sectional detail view taken on the line 5—5 in Fig. 1. Fig. 6 is a sectional detail view taken on the line 6—6 in Fig. 1. Fig. 7 is a detail view, partly in elevation and partly in section, on the line 7—7 in Fig. 1. Fig. 8 is a sectional detail view, enlarged, taken on the line 8—8 in Fig. 2. Fig. 9 is a sectional detail view, enlarged, taken on the line 9—9 in Fig. 2.

Corresponding parts in the several figures are denoted by like characters of reference.

The frame structure of the improved machine includes a mast or upright 15 which may consist of a pipe or tube which is supported at its lower end at the intersection of two cross beams 16, said beams being mortised or otherwise connected together. The upright 15 supports a sleeve 17 having sockets 18 for the reception of the upper ends of the inclined braces 19, the lower ends of which abut upon and are supported by shoes 20 connected with the cross beams 16.

The top face of the sleeve 17 is provided with a ball race for the reception of anti-friction balls 21 supporting a revoluble sleeve 22 which surrounds the upright 15, anti-friction rollers 23 being interposed between the opposed faces of the upright and the revoluble sleeve to reduce lateral friction, the downward thrust being supported by the anti-friction balls 21. The sleeve 22 is provided with radial sockets 23 in which the inner ends of arms 24, preferably consisting of I-beams, are supported. The arms 24 are equipped with sleeves or collars 25 having rings or eyes 26.

Supported at the upper end of the mast or upright 15 is a cap 27 having an upwardly extending stem 28 provided with laterally extending arms or spindles 29. Mounted on the cap 27 for axial rotation about the stem 28 is a spider 30 having eyes 31 that are connected by guy rods 32 with the links or eyes 26, thereby assisting materially in supporting said arms and the weight imposed thereon. Anti-friction balls 33 may be interposed between the cap 27 of the spider 30. The spider is formed with a bevel gear 34 meshing with bevel pinions 35 that are supported for rotation on the spindles 29. The stem 28 supports at its upper end a perch 36 on which is mounted a figure or image of a bird, such as an eagle 37, the wings of which 38 are pivotally connected with the body thereof, said wings being also connected by pitmen 39 with wrist pins 40 on the bevel pinions 35. It will be understood that the mast or upright 15 is relatively stationary when the machine is in operation and that the cap 27 with the stem 28 and related parts will likewise be stationary, while the spider 30 having the bevel gear 34 will be rotated. Motion will thus be transmitted through the pinions 35 and pitmen 39 to the wings 38 which will thus be actuated, thus giving the appearance of the bird flapping its wings.

Mounted securely on the mast or upright 15 a short distance above the revoluble sleeve 22 is a master wheel consisting of a bevel gear 41. Some of the radial arms 24 support a motor 42 having a driven shaft 43 carrying a bevel pinion 44 that meshes with a bevel gear 41. The shaft 43 is also equipped with a brake wheel 45 that may be engaged by a friction brake 46 of ordinary well known construction. It will be readily seen that when the motor is in operation the sleeve 22 and the spider 30 will be caused to rotate about the axis of the mast or upright 15, together with the arms 24, guy rods 32 and all related parts.

The radial arms 24 are so arranged that the spaces between said arms will be alternately wide and narrow. In the relatively wide spaces the passenger vessels or vehicles P are mounted or supported, as will be hereinafter described. In the relatively narrow spaces are supported steps or stairways 47, the upper ends of which are made fast to the arms 24, as indicated at 48, while the lower ends of said steps or stairways are supported clear of the ground by means of suspension rods 49. The steps 47 lead to the floor sections 50 which are supported on the arms 24, as shown, said floor sections being arranged in circumferential series, and said floor sections being provided with guard rails 51.

The passenger vessels or vehicles P may be constructed to simulate vessels for the navigation of the sea or the air, and vessels of various configurations have been shown in the drawings. While no limitation is made to the design of the vessels, it will be understood that all the vessels or vehicles are to be supported in such fashion that oscillatory or rocking movement may be imparted thereto. Two types of such oscillatory vessels have been shown, in one of which, generally designated by 52, the vessel is supported for rocking movement in the direction of its length to imitate the plunging of a vessel at sea, while another type, generally designated by 53, is supported transversely for oscillatory movement to imitate the rolling of a vessel at sea.

To support a vessel of the first type, as 52, two of the arms 24 are connected together by brace bars 54, 55 made preferably of channel iron, the outermost bar 55 being bent, as shown, to provide additional width intermediate the ends of the brace bars. The braces 54, 55 support bearing members 56, and the vessel 52 is provided at the sides, intermediate the ends thereof, with trunnions 57 engaging the bearings. The vessel 52 is provided at one end thereof with a bracket 58, said bracket being connected by a pitman 59 with a crank 60 at one end of a shaft 61 which is supported for rotation radially with respect to the upright 15, said shaft being equipped with a bevel gear 62 meshing with a bevel gear supported on the mast or upright and which may obviously be the master wheel 41, although within the scope of the invention an auxiliary bevel gear 63 may be utilized for this purpose.

The vessels of the type generally designated by 53 are provided at the ends thereof with trunnions 64 for which bearings 65 are provided on the arms 24. This type of vessel is preferably reinforced by a truss rod 66 extending lengthwise beneath the vessel and provided with terminal collars 67 engaging the trunnions 64. Struts 68 are interposed between the truss rods 66 and the bottom of the vessel 53. The latter is provided at one side thereof with a bracket 69 which is connected by a pitman 70 with a crank 71 on a shaft 72 that is supported for rotation radially with respect to the upright 15, said shaft being equipped with a bevel gear 73 meshing with a bevel gear supported on the upright 15 and which may be either the master wheel or an auxiliary wheel, such as shown at 63.

It will be seen that by the construction herein shown and described when the motor is in operation and the sleeve 22 and spider 30, together with the parts supported thereon are rotated, the rotation of the shafts 61 and 72 will cause a swinging movement to be imparted to the vessels 52 and 53, the only difference being that the vessels 52 will be swung in the direction of their length to imitate the plunging of a vessel, while the vessels 53 will be swung transversely to imitate the rolling of a vessel. An amusement device is thus provided which when in operation will present a novel and attractive appearance, the construction being inexpensive and of such a nature as to enable the parts to be very easily and quickly assembled or disassembled for storage or transportation.

Having thus described the invention, what is claimed as new, is:—

1. An amusement device comprisng an upright, an element supported for rotation thereon and including radially extending arms, floor sections supported on said arms in circumferential series, and stairways supported between the radial arms to provide means of access to the floor sections.

2. An amusement device comprising an upright, an element supported for rotation thereon and including radially extending arms, floor sections supported on said arms in circumferential series, and stairways supported between the radial arms to provide means of access to the floor sections, said floor sections being provided with guard rails and suspension rods being provided to support the stairways clear of the ground.

3. In an amusement device, a relatively stationary upright having a cap at its upper end, an element mounted for rotation on the upright, said element including a sleeve, a spider, radial arms socketed in the sleeve, and guy rods connecting the arms with the spider, said spider having a bevel gear, a stem extending upwardly from the cap through the spider and having laterally extending arms provided with pinions meshing with the bevel gear, said pinions having wrist pins, a body perched on the stem, wings pivotally connected with the body, and pitmen connecting the wings with the wrist pins of the pinions.

4. In an amusement device, a mast or upright, an element mounted for rotation therein and having radially extending arms, a bevel gear fixed on the upright, a motor mounted on some of the radial arms and having a driven shaft provided with a pinion meshing with the fixed gear wheel, a passenger vehicle swingingly supported with respect to some of the radial arms, said vehicle being provided with a bracket, means for rocking the vehicle including a driven shaft supported for rotation on the rotary element and having a crank at one end, and a pitman connecting said crank with the bracket on the vehicle; the rotary element being provided with floor sections supported on the radial arms and arranged in circumferential series, steps connected with some of the radial arms, and suspension rods also connecting the steps with some of the radial arms to support the steps above the floor level.

In testimony whereof I affix my signature in presence of two witnesses.

GEORGE M. REAGEN.

Witnesses:
JOHN BRUNSKILL,
C. E. COTTOM.

Copies of this patent may be obtained for five cents each, by addressing the "Commissioner of Patents, Washington, D. C."